United States Patent [19]
Zaid

[11] Patent Number: 5,595,679
[45] Date of Patent: Jan. 21, 1997

[54] CORROSION INHIBITOR

[75] Inventor: Najib H. Zaid, Sterling, Kans.

[73] Assignee: Jacam Chemical Partners Ltd., Sterling, Kans.

[21] Appl. No.: 489,743

[22] Filed: Jun. 13, 1995

[51] Int. Cl.$^6$ ........................................................ C09K 3/18
[52] U.S. Cl. ............................ 252/70; 106/13; 106/14.44; 252/389.3
[58] Field of Search ................................. 106/13, 14.14, 106/14.44; 252/70, 389.3

[56] References Cited

U.S. PATENT DOCUMENTS

| | | | |
|---|---|---|---|
| 3,607,757 | 9/1971 | McDonald | 252/75 |
| 4,138,353 | 2/1979 | Lipinski | 106/14.12 |
| 4,606,835 | 8/1986 | Lieber et al. | 252/70 |
| 4,713,184 | 12/1981 | Zaid | 252/8.552 |
| 5,427,705 | 6/1995 | Simper | 106/13 |
| 5,429,763 | 7/1995 | Dieupart | 106/13 |

OTHER PUBLICATIONS

The PQ Corporation; Bulletin 37–3; "PQ–Soluble Silicates: For Protection of Water Systems From Corrosion", pp. 1–10; Mar. 5, 1993.

Browning Chemical Corporation; Specifications for Sodium Metasilicate, Pentahydrate.

*Primary Examiner*—Anthony Green
*Attorney, Agent, or Firm*—Hovey, Williams, Timmons & Collins

[57] ABSTRACT

Improved corrosion inhibitors for use with road deicing compositions are provided which lessen the typical corrosive properties on metal and/or concrete resulting from application of road deicers. The inhibitors of the invention include respective quantities of a citrate component such as citric acid, as well as a second silicate or metasilicate component, e.g., sodium metasilicate. The inhibitor compositions preferably include from about 0.5%–50% by weight of the citrate component and from about 50%–99.5% by weight of the second component. The inhibitors are generally used at a level of at least about 1.5% by weight to create inhibited road deicing mixtures.

14 Claims, No Drawings

CORROSION INHIBITOR

BACKGROUND OF THE INVENTION

1. Field of the Invention

The present invention is broadly concerned with improved corrosion inhibitor formulations specifically adapted for incorporation into deicing road salts. More particularly, the invention pertains to such corrosion inhibitors, and to mixtures thereof with road salts, wherein the inhibitors contain respective amounts of a first component selected from the group consisting of citric acid, salts of citric acid, and mixtures thereof, and a second component selected from the group consisting of alkali metal silicates, alkali metal metasilicates, and mixtures thereof. Use of the corrosion inhibitors of the invention materially lessens the corrosive effect of the road salts on metal surfaces, and is also believed to have an ameliorating effect upon corrosion of concrete surfaces.

2. Description of the Prior Art

Municipalities and highway departments use vast quantities of road deicers during wintertime to deice roadways. The most traditional deicer is simply coarse sodium chloride. In recent years, mixed salt deicers have also been employed, e.g., sodium chloride mixed with calcium magnesium acetate (CMA) or magnesium chloride.

A serious problem with prior road deicers has been their corrosive effective on concrete and metal surfaces. For example, heavy use of road deicers can lead to powdering of concrete surfaces and rapid deterioration of metal reinforcing rods in poured concrete roadways and bridges. Use of CMA in traditional sodium chloride deicers is thought to reduce the corrosive effects thereof, but CMA is a very expensive chemical in the context of road deicers. Likewise, attempts have been made to use magnesium chloride with sodium chloride deicers for corrosion inhibition purposes. While some improvement in corrosive properties is obtained, magnesium chloride is expensive, large amounts are required, and the additive adversely impacts upon the handling properties of the deicer (e.g., the hygroscopic nature thereof leads to clumping during storage).

There is accordingly a need in the art for an improved corrosion inhibitor adapted for addition to otherwise conventional road deicer compositions which are low in cost and do not detract from the handling and use characteristics of the road deicers.

SUMMARY OF THE INVENTION

The present invention overcomes the problems outlined above, and provides improved corrosion inhibitors for road deicers. Broadly speaking, the corrosion inhibitors of the invention comprise a mixture of a first component selected from the group consisting of citric acid, a salt of citric acid and mixtures thereof, and a second component selected from the group consisting of alkali metal silicates, alkali metal metasilicates and mixtures thereof.

In preferred forms, citric acid is used as the first component of the corrosion inhibitor. However, citric acid salts such as sodium or potassium citrate could equally be used. The second component is most preferably sodium metasilicate, but sodium silicate and the other alkali metal silicates and alkali metal and metasilicates could also be employed. In the case of sodium metasilicate, the anhydrous form thereof is preferred in order to avoid clumping with the citrate component.

The first citrate component is preferably present at a level of at least about 0.5% by weight in the corrosion inhibitor, whereas the second component is present at a level of at least about 50% by weight. Preferably, the first component is used at a level of from about 0.5–50% by weight, more preferably from about 25–35% by weight, whereas the second component is used at a level of from about 50–99.5% by weight, and more preferably from about 65–75% by weight.

The corrosion inhibitors of the invention are prepared simply by mixing together the first and second ingredients which are each in granular form at room temperature. Alternately, the respective ingredients of the inhibitors can be mixed individually with road salt in the preparation of a final product of commerce.

In use, the corrosion inhibitors of the invention are added to a road deicer salt composition at a level of at least about 1.5% by weight, and more preferably from about 1.5–5% by weight. The singlemost preferable level of use is about 3% by weight.

Final road deicing mixtures in accordance with the invention have reduced corrosive properties and comprise quantities of sodium chloride and at least about 1.5% by weight of the described corrosion inhibitor. At this level, the first citrate component of the corrosion inhibitor is present in the road deicing mixture at a level of at least about 0.0075% by weight, while the second component of the inhibitor is present at a level of at least about 0.75% by weight. Using the more preferred corrosion inhibitor compositions, the first citrate component is present in the road deicing mixtures at a level of from about 0.0075–0.75% by weight (most preferably from about 0.375–0.525% by weight) while the second component is present at a level of from about 0.75–0.149% by weight (most preferably from about 0.975–1.13% by weight).

DESCRIPTION OF THE PREFERRED EMBODIMENTS

The presently most preferred corrosion inhibitor in accordance with the invention is made up of 28% by weight citric acid and 72% by weight anhydrous sodium metasilicate. The citric acid is a product of commerce and may be purchased from ADM of Decatur, Ill. The anhydrous sodium metasilicate is likewise a product of commerce and can be purchased from the PQ Corporation, Valley Forge, Pa. With these two starting ingredients, both in granular form, the product is formulated by simple mixing to substantial homogeneity using a ribbon mixer or similar device.

This corrosion inhibitor is then mixed with sodium chloride or other type of road deicer. Again, no special formulation steps are required so long as the inhibitor is substantially uniformly dispersed throughout the deicer composition. In use, it is believed that the corrosion inhibitor of the invention forms a protective polymeric film on metal and/or concrete surfaces which inhibits the corrosive effect of the sodium chloride in the road deicer composition.

The following example illustrates the inhibitory properties of the corrosion inhibitors of the invention. It is to be understood, however, that this example is provided by way of illustration only and nothing therein shall be taken as a limitation upon the overall scope of the invention.

EXAMPLE

In this example, a series of comparative tests were conducted to determine the effectiveness of the corrosion inhibitors of the present invention. In particular, the test methods described in *Handbook of Test Methods for Evaluating Chemical Deicers,* SHRPH-205.7 were employed.

In the first step, ¾"×3" flat coupons of 1018 cold-rolled carbon steel were obtained from V. K. Enterprises, Oklahoma City, Okla. These coupons were weighed to confirm the manufacturer's listed weights and were then immersed in test solutions.

The following test solutions were prepared:

1. Three sodium citrate/brine solutions each containing 100 cc of tap water with, respectively, 0.99% by weight NaCl and 0.1% by weight sodium citrate (1% solution), 0.97% by weight NaCl and 0.03% by weight sodium citrate (3% solution), and 0.95% by weight NaCl and 0.05% by weight sodium citrate (5% solution).
2. Three sodium metasilicate/brine solutions each containing 100 cc of tap water with, respectively, 0.99% by weight NaCl and 0.1% by weight sodium metasilicate (1% solution), 0.97% by weight NaCl and 0.03% by weight sodium metasilicate (3% solution), and 0.95% by weight NaCl and 0.05% by weight sodium metasilicate (5% solution).
3. Three sodium metasilicate/citrate acid/brine solutions each containing 100 cc of tap water with, respectively, 0.99% by weight NaCl, 0.0028% by weight citric acid and 0.00072% by weight sodium metasilicate (1% solution), 0.97% by weight NaCl, 0.0084% by weight citric acid and 0.0216% by weight sodium metasilicate (3% solution), and 0.95% NaCl, 0.014% by weight citric acid and 0.036% by weight sodium metasilicate (5% solution).

Each of these solutions was prepared in duplicate and a test coupon was immersed in each. These immersions were allowed to sit undisturbed at room temperature for a period of 13 days. The individual test coupons were then removed from the immersion baths and rinsed with a very dilute (1 N) inhibited hydrochloric acid solution (Armo-Hib 5686, obtained from Akzo-Nobel, Chicago, Ill.)) for 10 seconds each, rinsed with tap water and acetone, and placed in a drying oven at 103° C. for about 4 hours. The dried coupons were then placed in a desiccator for about 4 hours. Each of the coupons was then weighed and the metal loss expressed as mils per year (MPY) was calculated using data provided by the coupon manufacturer.

The following table sets forth the results of these tests:

TABLE 1

| | TEST SOLUTIONS | | | | | | | | |
|---|---|---|---|---|---|---|---|---|---|
| | Solution Type | | | | | | | | |
| | NaCl/ Sodium Citrate | | | NaCl/ Na Metasilicate | | | NaCl/ Citric Acid/ Na Metasilicate | | |
| | Solution % | | | | | | | | |
| | 1% | 3% | 5% | 1% | 3% | 5% | 1% | 3% | 5% |
| MPY Loss | 0.82 | 0.70 | 0.74 | 0.92 | 0.72 | 0.70 | 0.92 | 0.36 | 0.44 |

These results clearly demonstrate a synergistic effect through the use of the combination of citric acid and sodium metasilicate as a corrosion inhibitor. Referring to the 3% solution test data, it will be seen that the MPY is 0.36 mils whereas the comparative 3% test solutions of sodium citrate and sodium metasilicate alone give MPY losses of 0.70 and 0.72 mils respectively.

I claim:

1. A road deicing mixture having reduced corrosive properties and comprising a quantity of sodium chloride and at least about 1.5% by weight of a corrosion inhibitor mixed with said sodium chloride, said corrosion inhibitor comprising a mixture of at least about 0.5% by weight of a first component selected from the group consisting of citric acid, a salt of citric acid and mixtures thereof, and an amount of a second component greater than said first component and selected from the group consisting of alkali metal silicates, alkali metal metasilicates and mixtures thereof.

2. The mixture of claim 1, said amount of said first component being at least about 0.0075% by weight in said mixture and said amount of said second component being at least about 0.75% by weight in said mixture.

3. The mixture of claim 2, said amount of said first component being from about 0.0075–0.75% by weight in said mixture and said amount of said second component being from about 0.75–1.49% by weight in said mixture.

4. The mixture of claim 3, said amount of said first component being from about 0.375–0.525% by weight in said mixture and said amount of said second component being from about 0.975–1.13% by weight in said mixture.

5. The mixture of claim 1, said corrosion inhibitor being present in said quantity of sodium chloride at a level of from about 1.5–5% by weight.

6. The mixture of claim 5, said level being about 3% by weight.

7. A corrosion inhibitor for addition to road salt, said corrosion inhibitor comprising a mixture of at least about 0.5% by weight of a first component selected from the group consisting of citric acid, a salt of citric acid and mixtures thereof, and an amount of a second component selected from the group consisting of alkali metal silicates, alkali metal metasilicates and mixtures thereof, said first and second components being granular, said amount of said second component being greater than the amount of said first component.

8. The inhibitor of claim 7, said amount of said first component being present at a level of at least about 0.5% by weight, and said amount of said second component being present at a level of at least about 50% by weight.

9. The inhibitor of claim 8, said amount of said first component being present at a level of from about 0.5–50% by weight, and said amount of said second component being present at a level of from about 50–99.5% by weight.

10. The inhibitor of claim 7, said first component being citric acid.

11. The inhibitor of claim 7, said second component being sodium metasilicate.

12. A corrosion inhibitor for addition to road salt, said corrosion inhibitor comprising a mixture of a first component selected from the group consisting of citric acid, a salt of citric acid and mixtures thereof, and a second component selected from the group consisting of alkali metal silicates, alkali metal metasilicates and mixtures thereof, said first component being present at a level of at least about 0.5% by weight, and said second component being present at a level of at least about 50% by weight.

13. The inhibitor of claim 12, said first component being citric acid, and said second component being sodium metasilicate.

14. The inhibitor of claim 12, said first and second components being granular.

\* \* \* \* \*